United States Patent [19]

Pan

[11] 4,377,908

[45] Mar. 29, 1983

[54] METHOD AND APPARATUS FOR BENDING THE OVERLAPPING EDGE PORTIONS OF A METAL SHIELD AROUND A CABLE CORE

[75] Inventor: Ali Pan, Storrington, Canada

[73] Assignee: Northern Telecom Limited, Montreal, Canada

[21] Appl. No.: 264,279

[22] Filed: May 18, 1981

[51] Int. Cl.[3] .......................... B23P 11/00; B23P 19/00; B21D 5/06

[52] U.S. Cl. .......................... 29/828; 29/728; 72/52; 72/177; 72/702; 156/54; 156/461; 228/148

[58] Field of Search .......................... 29/505, 728, 828; 72/51, 52, 177, 179, 181, 702; 156/54, 461, 202, 203; 228/130, 148

[56] References Cited

U.S. PATENT DOCUMENTS

| | | | |
|---|---|---|---|
| 696,865 | 4/1902 | Friel | 29/728 |
| 3,785,048 | 1/1974 | Petersen | 156/54 X |
| 4,100,003 | 7/1978 | Trusch | 156/54 |
| 4,308,662 | 1/1982 | Bohannon | 29/828 |

FOREIGN PATENT DOCUMENTS

| | | | |
|---|---|---|---|
| 920434 | 2/1973 | Canada | 72/52 |
| 25425 | 11/1931 | Netherlands | 72/51 |
| 2037638 | 7/1980 | United Kingdom | 72/52 |

*Primary Examiner*—Ervin M. Combs
*Attorney, Agent, or Firm*—R. J. Austin

[57] ABSTRACT

Controlling the bending of an overlapping edge portion of a metal shield of a cable core by supporting one side of an edge portion at a position along its feed path and applying pressure against the edge portion immediately downstream of and in a direction opposite to the support. Bending of the edge portion occurs immediately it has passed the support while the support dampers resiliency in the edge portion to prevent or lessen spring-back. Apparatus for bending is placed immediately upstream of the overlapping die and preferably includes means to vary the applied pressure. Hence, the desired orientation of the bent edge portion is obtainable by varying the pressure dependent upon the actual orientation as the overlapped shield leaves the die.

10 Claims, 10 Drawing Figures

METHOD AND APPARATUS FOR BENDING THE OVERLAPPING EDGE PORTIONS OF A METAL SHIELD AROUND A CABLE CORE

This invention relates to controllably bending the overlapping edge of a metal shield around a cable core.

During the manufacture of certain constructions of telecommunications cable, a metal shield is wrapped around the finished cable core. The shield may be made of aluminum or steel, dependent upon requirements, and may also be corrugated or uncorrugated. Aluminum is used when it is desired to protect the core from lightning surges when the cable is in use. Alternatively, the shield is made from steel to strengthen it when the cable is to be subjected to crushing loads, for instance when buried or as a protection against being cut into by things such as rocks or rodents. Sometimes, aluminum and steel shields are employed in the same cable.

Conventionally, a shield is wrapped around a cable core and the edge portions of the shield overlap longitudinally along the core. It is sometimes required to join the overlapped edge portions together, for instance by soldering or bonding, so as to increase protection to the core.

A problem exists in that a shield is formed from flat tape and it needs to be formed into a tube for wrapping around a core. While it is possible to cause the tube to conform closely to the generally circular shape of the core, a problem exists in shaping the overlapping edge portion to conform to the overlapped edge portion. In practice, there is a tendency for the overlapping edge portion to project outwards from the overlapped end as it extends to the actual edge. This problem may be overcome when the edge portions are to be soldered together because the overlapping edge portion may be held forcibly down onto the overlapped portion during soldering and thereafter remains permanently in position. However, if the edge portions are to remain unjoined, the outwardly projecting edge protrudes into the elastomeric jacket which is extruded around the shield and it may eventually cut through the jacket to provide a path for water or moisture into the cable. A secondary disadvantage is that the projecting edge distorts the otherwise substantially smooth circular shape of the jacket thereby creating a longitudinal ridge in the jacket which directly overlies the edge. Further, if it is intended for the edge portions to be joined by bonding by the fusing of heat fusible layers of polymer on the edge portions by the heat provided by the jacket extrusion process, these edge portions cannot join together correctly if the overlapping portion projects outwards in the manner discussed above. With present knowledge, it is extremely difficult to design apparatus which can guarantee intimate and overall contact of the edge portions so as to provide a width of bond corresponding to the width of the overlap. One problem is that present apparatus for edge bending does not provide exactly the bend position required and resiliency in the metal tends to cause straightening of the bend after its formation.

In U.S. Pat. No. 4,100,003, there is described a method and apparatus for turning the overlapping edge portion of a shield inwardly towards the cable core to preclude the edge portion of the shield from protruding into a subsequently extruded jacket of the cable. While this invention may be effective in achieving its desired result, any apparatus designed for turning the edge portion inwards is limited to the cable size limitations imposed by the overlapping die of which it forms a part, whereby a range of sizes of turning apparatus is required for the complete range of cable diameter. In addition, because of the constructional design of the total apparatus, there can be no provision made to adjust the formed shape of the inwardly turned end portion whereby it cannot be made to conform intimately to the outer surface of the overlapped end portion and a wide joined overlap cannot be formed by heat fusible material during the jacket extrusion process.

The present invention provides a method and apparatus for controllably bending an overlapping edge for metal shields.

Accordingly, the present invention provides a method of controllably bending an edge portion of a metal strip while forming a shield of a cable core comprising bending said edge portion about a longitudinally extending bend position while moving the strip towards an overlapping die, the bending performed by supporting one side of the edge portion by a support surface and applying pressure to the other side of the edge portion in a position displaced immediately downstream from the support surface to bend the edge portion as it becomes unsupported when it moves beyond the support surface thereby to dampen resiliency in the strip, and then forming the strip into a shield surrounding the cable core with said edge portion overlapping an opposite edge portion and with the direction of the bend being towards the opposite edge portion.

It is found that when the method according to the invention is followed, the damping effect produced by bending the edge portion over the support surface reduces the resilient return of the edge portion towards its unbent position thereby enabling a control upon the final bend angle.

In a preferred method, the pressure applied to the edge portion is adjusted to correspondingly adjust the bend angle while the strip is being fed towards the overlapping die whereby the position of the overlapping edge portion is adjusted to a desired position relative to the overlapped edge portion. Such a method enables the edge portions to be brought into substantial intimate and overall engagement.

The pressure may be applied to bend the edge portion while the strip is in a flat condition, i.e. before any forming of the strip towards the tubular shape of a shield takes place. However, care needs to be taken to avoid the possibility of changing the bend position of the edge portion after the bending operation. Hence, it is preferable to bend the edge portion immediately before the strip moves into the overlapping die. In this case, the strip will be partially formed towards tubular shape before the edge portion is subjected to its bending operation. Furthermore, if the bending operation is performed immediately before entry of the strip into the overlapping die, then where adjustment of pressure to bend the edge portion is a part of the process, a better degree of control of the final bend position is obtained.

The invention also includes an apparatus for wrapping a metal shield around a cable core comprising means to partially form a metal strip towards tubular shape partly surrounding a cable core and disposed in a first station along a feed path for the core; edge bending means to bend one edge portion of the partially formed strip about a longitudinally edge position of the material, said bending means disposed in a second station downstream from the first station and comprising a support having a support surface for one side of the edge portion and, in a position immediately downstream from the support surface, a pressure applying means to apply pressure to the other side of the edge portion and across the feed path of the edge portion to bend the edge portion, as it becomes unsupported, inwardly of the partially formed tubular shape, the support surface serving to dampen resilience in the metal; and an overlapping die in a third station downstream from the second station to form the material into the tubular shape of a shield around the core with said edge portion overlapping an opposite edge portion.

In the edge bending means, the support conveniently forms one side of a shaping channel for the edge portion. The bending means forms the edge portion towards its desired bent shape as the edge portion moves along the channel which changes in shape from position to position along its length towards the configuration required to give the desired bent shape. At the outlet end of the channel, the pressure applying means is located, and this forces the edge portion against the support surface and then beyond the position of the support surface as the metal strip becomes unsupported.

In a preferred arrangement, the bending means comprises a pressure applying means having a position adjusting means to adjust its position laterally of the feed path of the edge portion so as to adjust the pressure to said other side of the edge portion.

One embodiment of the invention will now be described, by way of example with reference to the accompanying drawings in which:

FIG. 1 is a cross-sectional view through a cable according to the prior art;

FIG. 2 is a view similar to FIG. 1 through a cable made according to a method described in U.S. Pat. No. 4,100,003;

Figure 1:
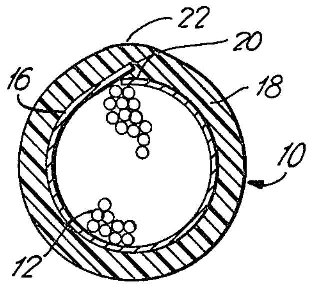

FIG. 1 shows a cross-sectional view of a telecommunications cable 10 of prior construction having a core 12 formed from a plurality of conductor pairs. The core is wrapped in a core wrap (not shown) surrounding which is an aluminum or steel shield 16 and an outer polymer jacket 18. The steel shield is formed from corrugated material which is coated on both surfaces with a thermoplastic layer. It is intended that the overlapping and overlapped end portions 20 of the shield should be bonded together to complete the shield and form total surrounding protection to the core. This bound in theory is based on the idea of contacting the thermoplastic layers of the end portions 20 which confront each other at the overlap whereby during the extrusion process for the jacket, the heat of extrusion softens those layers to cause them to fuse together. However, it may be extremely difficult or even impossible to perform this bonding operation either at all or over the complete width of the overlap. This is because conventional techniques for wrapping a shiled around a cable are not able to overcome the problem of resilient return of the overlapping end portion of the shield. After the overlapping end portion has been formed or bent to its correct position to overlie and intimately contact the overlapped end, its resilient tendency causes it to partially springback as the shield enters the jacketing die whereby the thermoplastic layers upon the end portions 20 are not successfully fused together. In the completed cable, the overlapping end portion projects outwardly away from the overlapped end portion as shown by FIG. 1 and projects into the jacket material. Apart from this structure looking unsightly because a longitudinal ridge 22 is formed along the jacket overlying the projecting overlapping end, there is also a distinct possibility that this end will cut through the jacket either during flexing or after it has been laid. This, of course, completely ruins the cable.

The above problems may be overcome by soldering or welding the overlapping ends 20 together as they may be held together during this bonding operation. However, soldering or welding requires a further process operation and sometimes it is necessary for such joining methods to be avoided.

Figure 2:
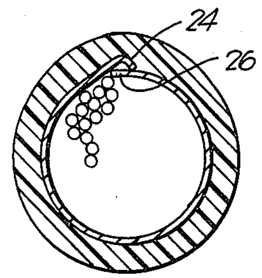

In one method of improving the shield structure of FIG. 1, U.S. Pat. No. 4,100,003 describes a method of forming the overlapping end inwardly into contact with the overlapped end. The finished structure, shown in FIG. 2, has the actual end 24 of the overlapping end contacting the overlapped end portion 26. While this method prevents the end 24 from protruding into the jacket, it does not provide a shield in which intimate engagement may be provided over the complete width of overlap and a fused bond between the end portions may only occur directly at the end 24. A further disadvantage with the invention described in this U.S. patent is that apparatus for turning inwards the end 24 can operate with a small range of cable diameters only thereby requiring a range of sizes of the apparatus for all cables.

Figure 4:
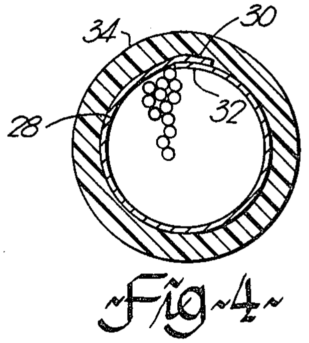
FIG. 4 is a view similar to FIG. 1 through anothercable made by apparatus according to the embodiment.
Figure 3:
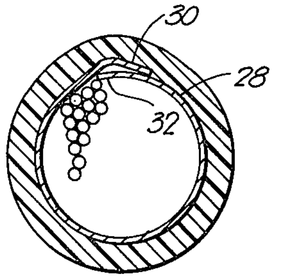
FIG. 3 is a view similar to FIG. 1 through one cable made by apparatus according to the embodiment.

The apparatus of the present embodiment for wrapping a shield around a cable core includes an edge forming means for controllably turning an overlapping edge portion and a single edge forming means is usable for all sizes of cable. Further, this edge forming means may be used to provide an inwardly projecting overlapping end as shown in FIG. 3 or an improved construction of shield 28 as shown in FIG. 4 wherein the overlapped and overlapping end portions 30 and 32 lie substantially in intimate engagement whereby thermoplastic covering layers on the engaging surfaces are effectually bonded together by the heat of extrusion of the jacket 34.

Figure 5:
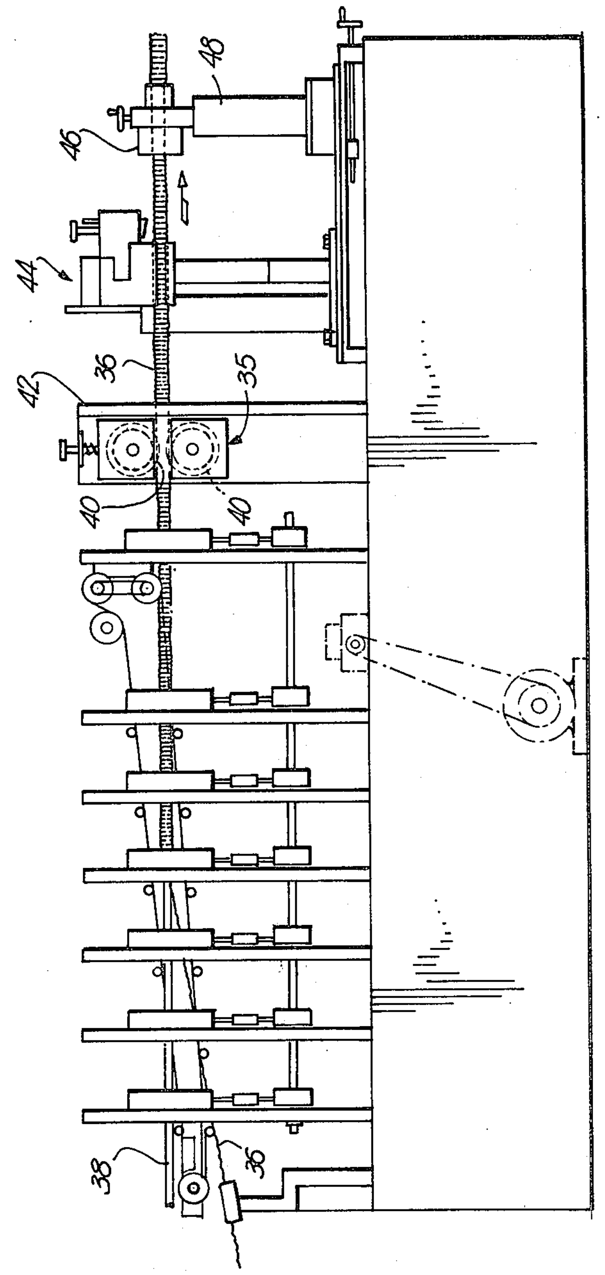
FIG. 5 is a side elevational view of part of apparatus according to the embodiment for wrapping a metal shield around a cable core of a telecommunications cable.

Apparatus according to this embodiment is shown in FIG. 5. This apparatus includes a former 35 for partially forming a corrugated metal tape 36 into an open curved shape and partly surrounding the cable core 38. This former is of conventional form and basically comprises two forming rolls 40 mounted in a frame 42 and located one at each side of a feed path for the core. This former will not be described further therefore.

Downstream of the former 35 is located an edge forming means 44 followed by an overlapping die 46. The latter is a conventional overlapping die mounted upon a frame 48 and comprising a conventional overlapping key 50 (FIG. 6) for overlapping the ends together. The die 46 will be described no further.

The edge forming means 44 comprises a former block 52 which defines an edge shaping channel 54 (FIGS. 7, 8 and 9) for forming the angle of inclination of an edge portion 32*a* relative to adjacent portions of the tape 36, the edge portion 32*a* intended to be the overlapping edge portion 32 in the completed shield. As is clear from FIGS. 7 and 8, the channel 54 changes in shape along its length for the purpose of forming the edge portion 32*a* inwardly of the partially formed tubular shield shape as the tape 36 is moved past the forming means.

The channel 54 is insufficient taken by itself to form the edge portion 32*a* into its final desired position as resiliency in the tape would cause springback of the edge portion after formation whereby it would project outwardly in the manner described with regard to FIG. 1.

Figure 10:
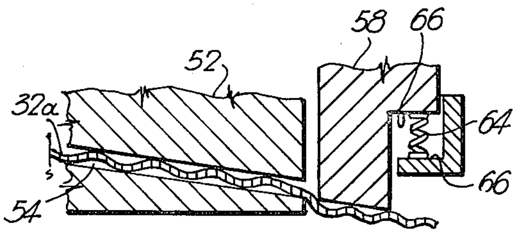
FIG. 10 is a cross-sectional view of the edge bending device taken along line 'IX—IX' in FIG. 7.
Figure 6:
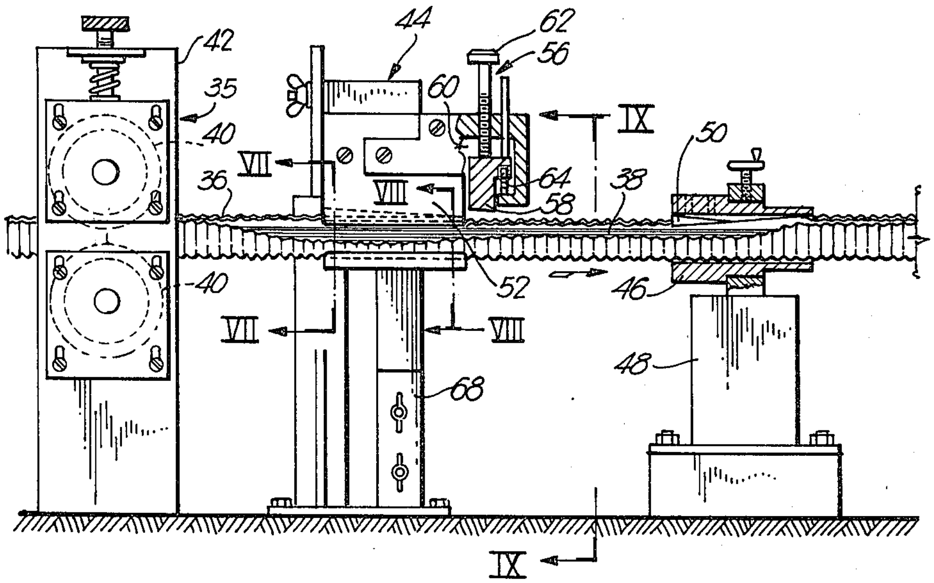
FIG. 6 is a view similar to FIG. 5 of part of the apparatus of FIG. 5 and on a larger scale.

To prevent the springback, the means 44 is provided with a pressure applying means 56 disposed immediately downstream from the channel 54. As shown by FIGS. 6 and 10, the means 56 comprises a plunger 58 which is slidable within a guide channel 60 formed in the forming block 52 and laterally relative to the length of channel 54. The plunger 58 may be moved across the outlet path from the channel 54. Adjusting means is provided to adjust the position of the plunger, the adjusting means comprising a manually adjustable screw-thread means in the form of a screw 62, screw threadedly received in the block 52 so as to abut an end of the plunger to urge the plunger across the channel 54 as desired. Movement of the screw 62 to withdraw the plunger from across channel 54 enables the plunger to be returned positively by a compression spring 64 held between confronting surfaces 66 of the plunger and the block. Engagement with the tape 36 by the plunger will also, of course, assist in its return movement.

Figure 9:
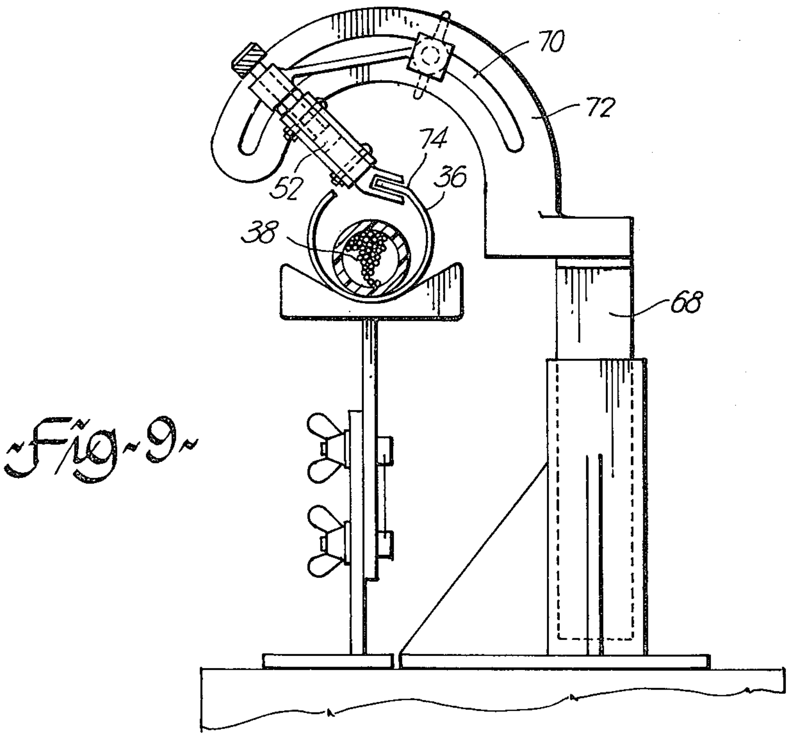

The block 54 is mounted on a frame 68 by means of a bolt and wingnut attachment (FIG. 6) which provides adjustment means for the block to be moved around an arc dictated by sliding movement of the bolt around an arcuate slot 70 formed in a mounting bracket 72 secured to the frame (FIG. 9). As may be seen from FIG. 9, the arcuate movement of the block is around a centre which coincides with or lies close to the bend position 74 for the edge portion 32*a*.

Figure 7:
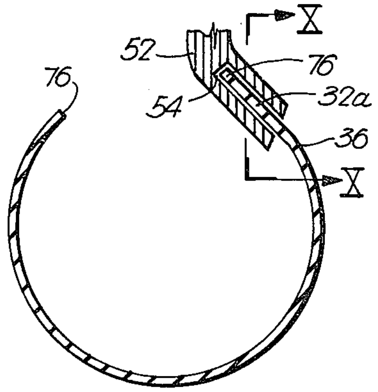
FIG. 7 is a cross-sectional view of the apparatus taken along line 'VII—VII' in FIG. 6 and on a larger scale.

In use of the apparatus, the core 38 and the unformed corrugated tape 36 are moved towards the former 35 where they are brought together and the tape is partially formed around the core towards the tubular shield shape. This operation is conventional and as the tape and core move beyond the former 35, the tape enters upwards around the core with its two ends 76 pointing upwards and spaced apart, for instance as shown by FIG. 7 when the tape enters the edge forming means 44. The edge portion 32*a* passes through the channel 54 as the tape moves past the block 52 towards the overlapping die.

Figure 8:
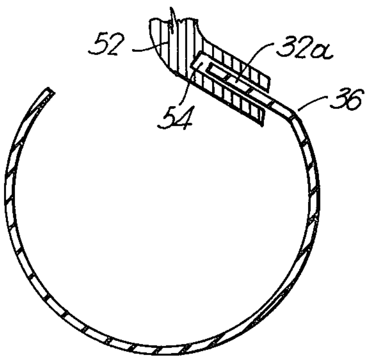
FIGS. 8 and 9 are cross-sectional views, on a larger scale, taken respectively along lines 'VIII—VIII' and 'IX—IX' in FIG. 6.

As the edge portion 32*a* moves through the channel 54, it is turned progressively inwards from the position of FIG. 7 to that of FIG. 8 so as to proceed close to its final overlapping position in the cable. The arcuate position of the block 52, is adjusted to the most appropriate for this purpose. As the edge portion moves out of the channel 54, the plunger 58 prevents any tendency for the edge portion to springback either as it leaves the block 52 or after it leaves the overlapping die. To effect this springback prevention, the plunger is moved downwardly across the outlet end of channel 54 to cause the edge portion 32*a* to be deformed downwardly around the plunger as it leaves the channel 54 for instance as shown by FIG. 10. This deformation action overcomes the resiliency in the metal of the edge portion and at its bend position whereby the bend angle of the edge portion 32*a* is made permanent.

It is believed that the reason why the plunger is capable of setting the bend position whereas other methods and apparatus have been unsuccessful in this regard is as follows.

The plunger 58 lies immediately downstream of the channel 54 whereby when the plunger applies pressure to one surface of the edge portion, the other surface is supported by the block, as it forms the lower surface of the channel, in the immediate upstream position from the plunger. Hence, the edge portion 32*a* is bent over by the plunger without any resilient movement of the tape 36 at the plunger position accounting for any of the downward movement of the edge portion. Thus, resiliency in the tape as it passes beneath the plunger is deadened or dampened by the support afforded by the block 52. The force applied by the plunger is absorbed entirely by the edge bending procedure upon the now deadened metal.

Because of the use of the plunger 56 in the above way, the edge portion 32*a* remains at its formed angle of bend relative to adjacent parts of the strip throughout the passage through the overlapping die and then through the extrusion jacketing process which is to follow. Hence, with the manual adjustment provided for the plunger, its position may be changed to alter the final formed position of the overlapping end 32 in the finished cable. It follows that after start-up of passage of cable core and the tape through the apparatus, an operator may easily see the relative positions of the overlapping ends 30 and 32 as the completed shield exits from the overlapping die. Then upon manual operation of the plunger position, he is able to alter the bend angle of the overlapping edge portion until the edge portions are in substantially intimate and overall contact as shown by FIG. 4. As the shield enclosed core passes through the extrusion jacketing process, the thermoplastic covering layers on the edge portions are then fused together to provide the universally desired bonded joint across the full width of the overlap.

Of course, the above apparatus may provide any type of joint required although the one in FIG. 4 is most desirable. For instance, as shown by FIG. 3, the edge portion 32*a* may be bent slightly too far to ensure the perfect joint of FIG. 4. In this case, the edge portion 32 in the completed cable extends inwardly slightly and into contact at its free end with the overlapped edge portion 30. This structure ensures that the edge portion 32 cannot cut through the jacket and a seal is provided by bonding of the edge portion 30 to the free end of edge portion 32.

As may be seen from above, apart from the advantages already outlined, the construction of FIG. 4 entirely eliminates a projection on the shield whereby a rib is avoided on the outside of the jacket. A desirable substantially smooth appearance thus results for the cable. Also, with the FIG. 4 cable, the change in angle of the shield at the bend position for the overlapping end 32*a* may be very slight. As a result, any non-circularity of the outer surface of the jacket is insignificant.

The above embodiment indicates how an edge portion of shield material may be controllably bent about a longitudinal bend position during the forming of an overlapping end so as to prevent springback. Importantly, it also enables the angle of bend to be as desired and adjustment into a desired position is also possible during actual use.

It is also important to note that one edge bending means as described in the embodiment and in apparatus according to the invention may be used successfully with any size of conventional overlapping die and former 35 as only the edge portion of the metal actually moves through the bending means.

The method is also applicable to the controlled bending of edge portions of non-corrugated strips and the above embodiment with suitable modifications will bend such strips in the way described.

The above invention is applicable to any cable having a metal shield. While a telecommunication cable comprising electrical conductors has been described, the invention is also applicable to manufacture of optical cable or electrical power cable.

What is claimed is:

1. A method of controllably bending one edge portion of a metal strip while forming a shield of a cable core comprising bending said one edge portion about a longitudinally extending bend position while moving the strip towards an overlapping die, the bending performed by supporting one side of the one edge portion by a support surface and applying pressure to the other side of the one edge portion in a position displaced immediately downstream from the support surface to bend the one edge portion relative to adjacent parts of the strip as it becomes unsupported when it moves beyond the surface thereby to dampen resiliency in the strip, and then forming the strip into a shield surrounding the cable core with said one edge portion overlapping an opposite edge portion and with the direction of bend being towards the opposite edge portion.

2. A method according to claim 1, comprising adjusting the pressure applied to said one surface to thereby adjust the bend angle of the one edge portion.

3. A method according to either claim 1 or claim 2, wherein said one edge portion is controllably bent to lie intimately in contact with the opposite edge portion in the completed shield.

4. A method according to claim 1 comprising bending said edge portion immediately before entrance into the overlapping die and adjusting the pressure applied to change the angle of bend of the edge portion dependent upon the position of the edge portion after passage of the strip through the overlapping die.

5. Apparatus for wrapping a metal shield around a cable core comprising:

means to partially form a metal strip towards tubular shape partly surrounding a cable core and disposed in a first station along a feed path for the core;

edge bending means to bend one edge portion of the partially formed strip about a longitudinally edge position of the material, said bending means disposed in a second station downstream from the first station and comprising a support having a support surface for one side of the edge portion and, in a position immediately downstream from the support surface, a pressure applying means to apply pressure to the other side of the edge portion and across the feed path of the edge portion to bend the edge portion, as it becomes unsupported, inwardly of the partially formed tubular shape, the support surface serving to dampen resilience in the metal; and an overlapping die in a third station downstream from the second station to form the material into the tubular shape of a shield around the core with said edge portion overlapping an opposite edge portion.

6. Apparatus according to claim 5 wherein the support surface defines one side of a shaping channel for the edge portion and the pressure applying means is located at an outlet end of the channel and is movable laterally across the channel.

7. Apparatus according to either claim 5 or claim 6 wherein the edge bending means comprises an edge shaping channel defining means and a position adjusting means to adjust the position of the pressure applying means laterally of the channel.

8. Apparatus according to claim 5 wherein the edge bending means defines a shaping channel for the edge portion with one side of the support surface defining one side of the channel, the pressure applying means is a solid plunger movable in a guide channel formed by the bending means and laterally of the direction of feed for an edge portion along the shaping channel, and position adjusting means is provided to adjust the position of the plunger laterally of the shaping channel.

9. Apparatus according to claim 8 wherein the adjusting means comprises a manually operable screw-threaded means mounted in the edge bending means and projecting into the guide channel to adjust the position of the plunger laterally of the shaping channel in one direction, and a spring means is disposed between the plunger and the bending means to return the plunger in the other direction.

10. Apparatus according to claim 9 wherein the edge bending means is mounted upon a support and is movably adjustable around an arc to change the bend angle of the edge portion.

* * * * *